United States Patent Office 3,406,826
Patented Oct. 22, 1968

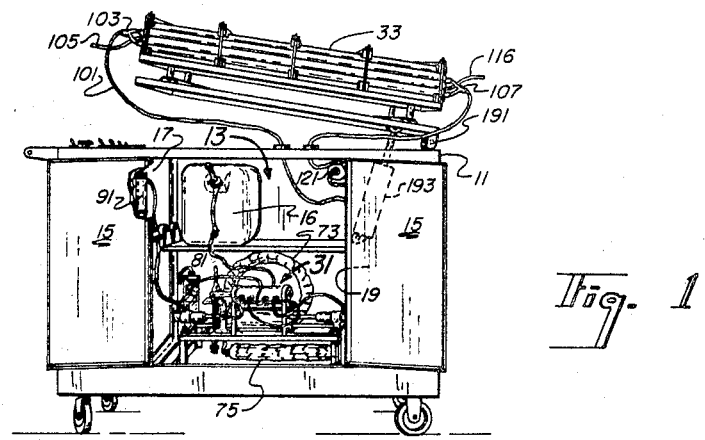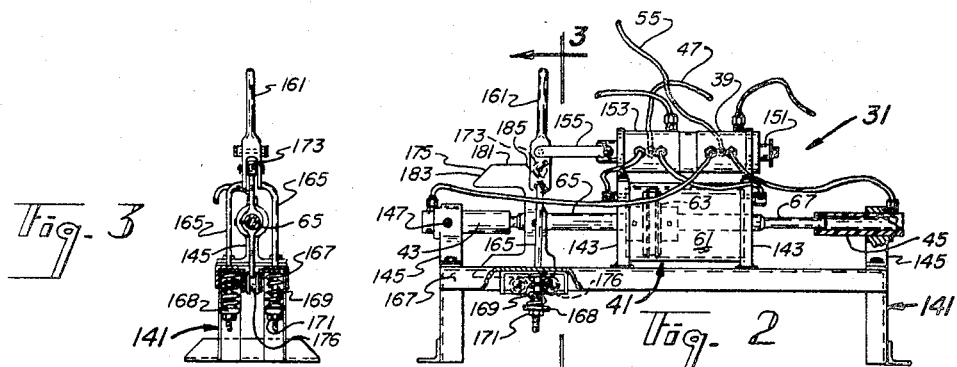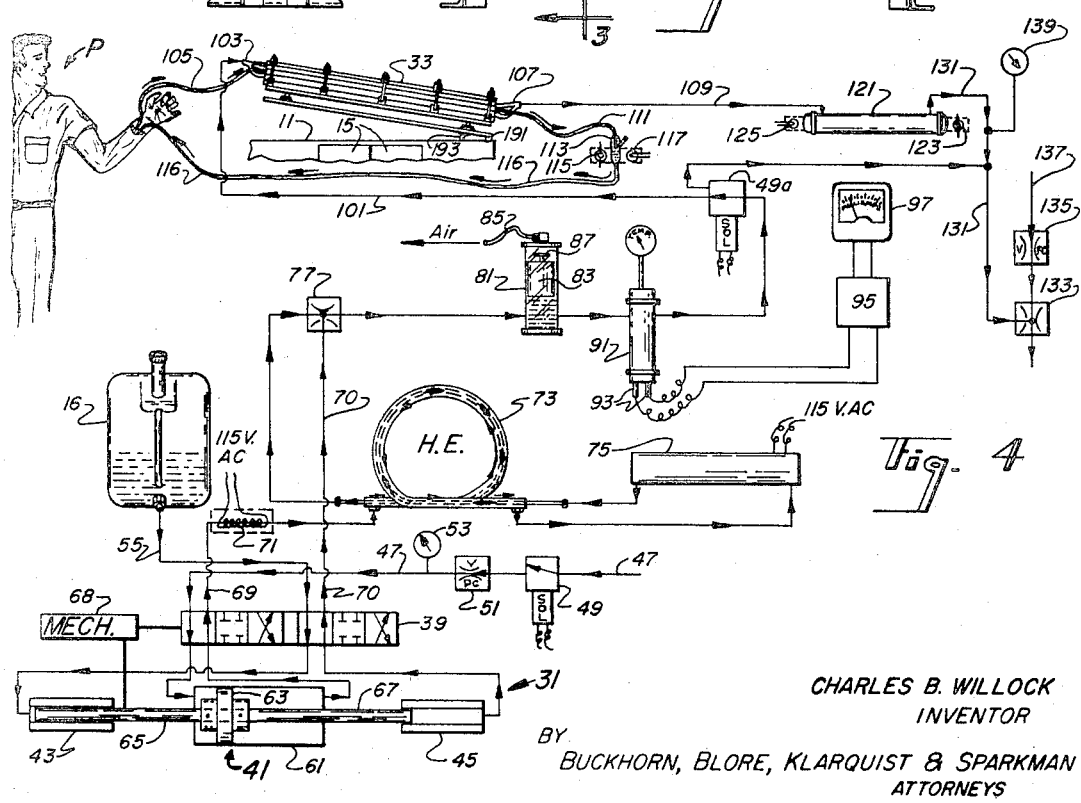

3,406,826
ARTIFICIAL KIDNEY LIQUID METERING
AND DISPENSING DEVICE
Charles B. Willock, 16222 SE. Oatfield Road,
Milwaukie, Oreg. 97222
Filed Nov. 17, 1965, Ser. No. 508,240
10 Claims. (Cl. 210—87)

ABSTRACT OF THE DISCLOSURE

A liquid measuring and combining apparatus, particularly adapted for use in an artificial kidney apparatus, wherein one piston is reciprocatingly driven by liquid pressure to reciprocatingly drive a second piston handling a second liquid, and wherein a reversing valve for controlling the liquid supply to and from the pistons is controlled by said one piston and is effective to direct the discharged liquids to a common combining line.

---

This invention relates to an artificial kidney machine and particularly to an apparatus for measuring the constituent liquids of the dialysate solution.

Hereofore, in artificial kidney machines, the dialysate solution has been mixed in batches. This is time-consuming and allows for error because it is difficult to make certain that successive batches of dialysate solution are of the same proportions.

A main object of the present invention is to provide an apparatus capable of continuously measuring and mixing liquids, and in particular to provide in an artificial kidney machine an apparatus for continuously measuring the constituent liquids making up the dialysate solution, whereafter such liquids are continuously mixed to provide a continuous supply of dialysate solution for the artificial kidney machine.

Various other objects of the invention will be apparent from the following description taken in connection with the accompanying drawings wherein:

FIG. 1 is a front perspective view of an artificial kidney machine of our invention showing the cart of the same with its doors open to show generally certain of the components of the machine;

FIG. 2 is a view on an enlarged scale of the liquid measuring and proportioning apparatus of the machine, with parts broken away for convenience in illustration;

FIG. 3 is a vertical sectional view taken along line 3—3 of FIG. 2;

FIG. 4 is a diagrammatic view of the essential components of my artificial kidney machine.

Referring to the drawings, FIG. 1 shows one embodiment of my artificial kidney machine in its inactive condition, whereas FIGS. 2, 3 and 4 show the machine in operation. In FIG. 1, the machine is shown as comprising a cart 11 having a central compartment 13 normally concealed by doors 15 which are shown as being open to disclose some of the components of my machine. The cart also includes two other compartments 17 and 19 which are disposed in flanking relation to compartment 13 and contain other components of my machine.

In general, the machine includes a concentrate container (or containers) 16 (FIG. 1) to supply by gravity a dialysate concentrate liquid to a measuring or proportioning apparatus generally entitled 31 which continuously and concurrently meters the flow of concentrate and tap water to provide a continuous supply of these liquids in predetermined proportions. The metered water is subsequently combined and mixed with the metered concentrate in a continuous fashion. However, prior to the mixing step, the water is heated to such a temperature that after being combined with the concentrate, the resulting dialysae solution is at approximately body temperature. This solution is then purged of most of the air entrained therein, and tested for salinity and temperature and then fed to a dialyzer 33 of known construction. Concurrently, blood from the patient P (FIG. 4) is pumped by the patient's heart through the dialyzer and therein cleansed and thereafter returned to the patient. The diffusate from the dialyzer is then tested for traces of blood and discharged as waste.

Specific description

The proportioning apparatus 31 includes a tandem type reversing valve 39 which controls the supply of water and dialysate concentrate to a double acting piston and cylinder unit 41 and a pair of single acting piston and cylinder units 43 and 45, respectively. Water is supplied to the control valve by a tap water line 47, there being an off-on solenoid valve 49 in the line 47 to control the supply of water to the reversing valve 39. There is also a pressure regulating valve 51 in the line 47 to supply water at a constant pressure regardless of variations in the main line water pressure. A pressure gauge 53 in the line 47 enables the regulating valve 51 to be adjusted to achieve the desired regulated pressure.

A line 55 from the concentrate container 16 leads to the reversing valve 39, so that line 55 constitutes a concentrate supply line for the valve 39 and the line 47 constitutes a water supply line for such valve.

The manner in which valve 39 controls the supply of water to the double acting piston and cylinder unit 41 and controls the supply of concentrate to the single acting piston and cylinder units will be presently explained, but first it should be pointed out that the unit 41 includes a cylinder 61 having a piston 63 reciprocable therein. The piston has a pair of piston rods 65 and 67 projecting therefrom in sliding sealed relation through the ends of the cylinder 61. The end free portions of the rods 65 and 67 constitute plungers or pistons for the units 43 and 45.

The reversing valve 39 is actuated by a mechanism 68 to be presently described in a manner such that the valve alternately directs tap water from the supply line 47 to the opposite ends of the cylinder 61 while providing for the alternate discharge of water from said ends to a discharge water line 69, and alternately and concurrently directs dialysate concentrate from the supply line 55 to the units 43 and 45 while providing for the alternate discharge of concentrate from such units to a concentrate discharge line 70. Thus measured quantities of water and dialysate concentrate are concurrently discharged from the cylinder units 61, 43 and 45 to provide the constituents of a dialysate solution.

The water in discharge line 69 is directed through a preheater 71 and then to a heat exchanger 73 of the coaxial tube type and having many turns, only one of which is shown in FIG. 4. The preheated water passes through the heat exchanger and then passes through a main electrical heater 75 where it is heated up to a substantial temperature, and directed back through the heat exchanger where it functions to warm up the incoming water from the preheater 71, and by virtue of this is rapidly cooled, but still is somewhat above body temperature. The warm water leaving the heat exchanger is directed to a mixing venturi 77 where it is mixed with the concentrate from the line 70 to provide a dialysate solution or bath (sometimes termed simply as the dialysate).

The dialysate solution is now fed to a float valve which includes a hollow upright cylindrical body 81 in which a cylindrical float 83 loosely fits. It should now be explained that the step of heating the water by the heater means of the kidney machine and then rapidly cooling this water in the heat exchanger (by virtue of its heating the incoming cooler water) functions to cause concentrations of the minute air bubbles therein into larger bubbles so that as the dialysate solution passes through the float valve, the air bubbles rise and pass upward past the float and out of an air vent line 85.

If for any reason the liquid in the float valve rises too high, a valve 87 on the upper end of the float 83 seats against a valve seat in the top of the body 81 and closes the vent line 85, until the situation is corrected.

The dialysate solution leaving the float valve is directed to a conductivity probe device 91 whose purpose is to test the salinity of the solution. The probe device includes a body providing a chamber into the lower end of which projects a pair of carbon probes 93. The probes are supplied with a desired voltage by an amplifier and power supply unit 95, and a milliampmeter 97 measures the current between the probes. The variations in current indicate the variations of the conductivity of the dialysate and thus the salinity of the solution. If the conductivity is either too high or too low, a control arrangement, not specifically shown, is actuated to shift the valve 49a and direct the flow of dialysate solution down the drain to bypass the dialyzer.

The dialysate solution is now fed via a tube 101 to a Y-piece 103 which directs the solution into the dialyzer and therethrough on opposite sides of the dialyzer membranes. The blood from the patient P is fed to the dialyzer by a tube 105 and between the mentioned membranes so that the impurities in the blood diffuse through the membranes in a known manner and are carried away by the dialysate solution, which is discharged from the diffuser through a Y-piece 107 and a discharge tube 109. The cleansed blood is discharged through a tube 111 which feeds the blood through a drip bulb 113 to a return tube 116. A photosensing unit 115 tests the blood for air bubbles with the aid of a light source 117, and if it senses objectionable bubbles, it sounds an alarm (not shown). It also sounds the alarm if the lines to the patient become tangled or twisted or compress closed for any reason. This is important because if the blood is shut off from the patient too long, it will clot the cannulas in the patient's arm (the cannulas being on the ends of the tubes 105 and 116 for insertion into the patient).

The tube 109 feeds the discharged dialysate solution and impurities (collectively known as the diffusate) to a blood detector 121. The latter has a photosensing unit 123 test for the presence of blood in the diffusate with the aid of a light source 125 and if blood is detected an alarm is given, the solenoid valve 49 is actuated to its off condition, the heating means is inactivated, and the supply of blood to the dialyzer is terminated until the dialyzer can be inspected to locate the rupture in the dialyzer membranes.

The diffusate leaves the blood detector 121 via a line 131 which leads to a venturi 133. Tap water is fed to the venturi through a pressure regulator 135 by a line 137. The venturi 133 creates a negative pressure in the line 131 to aid in the discharge of the diffusate. A negative pressure gauge 139 indicates the negative pressure in the line 131.

The previously mentioned actuating mechanism 68 is best shown in FIGS. 2 and 3 which also show that the double acting piston and cylinder unit 41 and the single acting piston and cylinder units 43 and 45 are mounted on a stand 141. The stand has a pair of mounts 143 by which the cylinder 61 is fixedly held in place, and has a pair of brackets 145 slidably receiving the cylinders of the units 43 and 45. A set screw 147 (one being shown) is provided for each bracket thereby enabling such cylinders to be fixedly held in place relative to the cylinder 61 thus establishing a fixed ratio of water to concentrate. Adjustability of the ratio can be obtained by operating the pistons for the cylinders 45 by means of a lever mounted intermediate its length on the stand by an adjustably positioned pivot and pivotally connected at its one end by a ball and socket joint to either rod 65 or 67 and at its other end by a ball and socket joint to one plunger or piston of either unit 43 or 45. A link would connect such plunger to the other plunger, and the cylinders of units 43 and 45 could be disposed alongside cylinder 65 and formed in the opposite ends of a cylinder block. Adjustment of the position of the lever pivot would change the water-to-concentrate ratio (for example, from 20–1 to 35–1). It is pointed out, however, that for a home unit, the ratio would normally be fixed while the ratio of a hospital unit usually would be adjustable.

The piston and cylinder unit 41 not only serves as a means for supplying measured quantities of water, but it also serves as a means of operating the tandem reversing valve 39. The valve is a spool valve having a spool 151 slidable within a valve body 153 and is connected by links 155 to a vertically movable cam follower device. This device includes an upright handle member 161 having a bifurcated lower portion which straddles a cam 175 and which has a pair of fixed depending legs 165. The latter pass easily through holes in the rails 167 of the stand 141 and through compression springs 169, the latter being contained between the rails 167 and washers 168 retained on the legs by nuts 171 threaded on such legs. Thus the compression springs urge the cam follower device to remain in its down position, the position shown in FIGS. 2 and 3.

The cam follower device has a follower roller 173 to engage a cam 175, the latter fitting around and being secured to the piston rod 65 and having a lower guide portion riding on a pair of flanged guide rollers 176 mounted on brackets secured to the rails 167. The cam 175 has a medial horizontal portion 181 flanked by two inclined portions 183 and 185.

In the positions of the parts in FIG. 2, water under pressure is just being admitted to the left hand end of the cylinder 61 and the spool 151 has just previously been moved to its right hand position (compare FIGS. 2 and 4).

Movement of the piston 63 to the right will cause the cam follower device to ride up the inclined cam edge 185 onto the horizontal cam portion 181, but this will not affect the position of the spool 151. As the piston 63 continues to move to the right, the cam will travel beneath the follower device until just before the piston reaches its extreme right hand position, the follower device will engage the left hand inclined portion 183 which action will cause the follower device to pivot slightly counterclockwise, which movement is permitted by the loose fit of the legs 165 in the holes in the rails and causes the spool 151 to shift to its left hand position. In such position, it is evident that the movement of the parts will be reversed, and will continue until the water is turned off.

The dialyzer 33 is pivotally mounted at 191 on the cart 11 and is supported in a somewhat downwardly inclined position from its inlet end to its outlet end. A ram 193 is provided by which the dialyzer can be raised to an upright position to drain the blood back into the patient at the end of the run. It is important to get practically every drop of blood back to the patient.

Having described my invention in what is believed to be the preferred embodiment thereof, it is desired that it be understood that the invention is not to be limited other than by the provisions of the following claims.

I claim:

1. An apparatus for measuring and combining predetetermined quantities of liquid of a first type and liquid of a second type, said apparatus comprising,
   a double acting piston and cylinder unit having a first piston disposed within a first cylinder,
   said first cylinder having closed opposite ends,
   said first piston having a piston rod on each side thereof projecting through the associated closed end of said first cylinder,
   a pair of second cylinders disposed one on either side of said first cylinder,
   a second piston in each of said second cylinders and connected to the associated rod for actuation thereby,
   reversing valve means connected to a source of liquid of said first type and operable to direct liquid of said first type alternately into the ends of said first cylinder and to provide for the discharge of said liquid of said first type from the ends of said first cylinder alternately and through said valve means, whereby measured quantities of liquid of said first type are discharged from said first cylinder, another reversing valve means for connection to a source of liquid of said second type and operable to direct liquid of said second type alternately to said second cylinders and to release alternately from said second cylinders the liquid therein of said second type to provide for the discharge of measured quantities of said second liquid from said second cylinders and through said another valve means, means for combining the discharged liquids to provide a source of liquid of predetermined proportions of liquids of said first and second types, and means mounting said cylinders for adjustment toward and away from said first cylinder whereby to facilitate varying the relative portions of the liquids being measured.

2. An apparatus as set forth in claim 1 in which one source of liquid being at a sufficient pressure to cause reciprocation of the associated piston or pistons whereby to effect measurement of predetermined quantities of both liquids, said reversing valve means comprising a tandem reversing spool valve having a shiftable spool, there being cam means driven by the piston of said first cylinder and cooperable with follower means connected to said spool to shift said spool in timed relation to the movement of the piston of said first cylinder.

3. An apparatus for measuring and combining predetermined quantities of liquid of a first type and liquid of a second type, said apparatus comprising, a double acting piston and cylinder unit having a first piston disposed within a first cylinder, said first cylinder having closed opposite ends, said first piston having a piston rod on each side thereof projecting through the associated closed end of said first cylinder, a pair of second cylinders disposed one on either side of said first cylinder, a second piston in each of said second cylinders and connected to the associated rod for actuation thereby, reversing valve connected to a source of liquid of said first type and operable to direct liquid of said first type alternately into the ends of said first cylinder and to provide for the discharge of said liquid of said first type from the ends of said first cylinder alternately and through said valve means, whereby measured quantities of liquid of said first type are discharged from said first cylinder, another reversing valve means for connection to a source of liquid of said second type and operable to direct liquid of said second type alternately to said second cylinders and to release alternately from said second cylinders the liquid therein of said second type to provide for the discharge of measured quantities of said second liquid from said second cylinders and through said another valve means, means for combining the discharged liquids to provide a source of liquid of predetermined proportions of liquids of said first and second types, and means mounting said cylinders for adjustment toward and away from said first cylinder whereby to facilitate varying the relative portions of the liquids being measured, said apparatus being part of an artificial kidney machine wherein the first liquid is water and the second liquid is dialysate concentrate, and wherein the first cylinder has a diameter a multiple of that of the second cylinder.

4. An apparatus as set forth in claim 3 in which there are heating means for heating the water after it leaves the first cylinder and before it is combined with the measured quantities of concentrate.

5. An apparatus as set forth in claim 4 in which there are venturi means for mixing the concentrate with the water after heating of the water to provide a dialysate solution and wherein there are float valve means for thereafter purging the dialysate solution of part of the air entrained therein.

6. An apparatus as set forth in claim 5 in which there are means for measuring the conductivity of said solution and operable to divert the solution whenever the conductivity is above or below a predetermined range.

7. An apparatus as set forth in claim 6 in which there is a dialyzer receiving the dialysate solution from the last named means, and wherein there are means for detecting the presence of blood in the solution leaving the dialyzer, and wherein there are venturi means for aiding in the travel of said solution through the just mentioned means, and wherein there are air bubble monitoring means for detecting the presence of bubbles in blood leaving the dialyzer and operable to energize an alarm upon detecting air bubbles and operable to energize an alarm in the event of stopping of the flow of blood in the system, and wherein there are means for supporting said dialyzer in a position slightly inclined to the horizontal and operable to raise the dialyzer to a more upright position to facilitate in draining and rinsing of the same.

8. A liquid combining apparatus comprising, a first piston and cylinder means, a second piston and cylinder means having its piston connected to and actuated by the piston of the first piston and cylinder means, reversing means for alternately directing a first liquid under pressure to and from the opposite ends of the cylinder of the first piston and cylinder means to cause reciprocation of the piston therein, control means mechanically interconnecting the piston of the first piston and cylinder means and said reversing valve means and actuated by such piston to cause reversing of said valve means, said reversing valve means alternately directing a second liquid to and from the opposite ends of the cylinder of the second piston and cylinder means, and means for receiving and combining the liquids discharged from said cylinders.

9. A liquid combining apparatus as recited in claim 8 wherein there is a single piston rod common to both cylinders and wherein part of the control means is carried by said piston rod at a place between the cylinders of said piston and cylinder means.

10. A liquid combining apparatus of claim 8, wherein the cylinders are separate entities disposed in spaced relation to one another, and wherein there is a single piston rod common to said cylinders and exposed to the ambient air at a place between said cylinders, and wherein each of the cylinders has its own sealing means sealingly engaging said piston rod whereby to avoid any possibility of inadvertent combining of the liquids in the cylinders other than in the intended manner.

References Cited

UNITED STATES PATENTS

| 2,427,429 | 9/1947  | Waite et al. | 222—129.2 X |
| 2,533,281 | 12/1950 | Oliveau      | 222—136     |
| 2,566,436 | 9/1951  | Waite        | 222—129.2 X |
| 2,736,466 | 2/1956  | Rodth        | 222—136     |
| 3,332,746 | 7/1967  | Claff et al. | 210—321 X   |
| 3,352,779 | 11/1967 | Austin et al.| 210—23      |
| 2,920,640 | 1/1960  | Porter       | 137—99      |

REUBEN FRIEDMAN, *Primary Examiner.*

F. SPEAR, *Assistant Examiner.*